United States Patent [19]

Thompson

[11] Patent Number: 4,580,225

[45] Date of Patent: Apr. 1, 1986

[54] METHOD FOR PRODUCING MULTIPLE ENTRY THREADS

[75] Inventor: Walter L. Thompson, Charlottesville, Va.

[73] Assignee: General Electric Company, Charlottesville, Va.

[21] Appl. No.: 534,793

[22] Filed: Sep. 22, 1983

[51] Int. Cl.$^4$ .............................................. G06F 15/46
[52] U.S. Cl. ................................... 364/474; 318/573; 318/579; 82/5; 364/475
[58] Field of Search ................ 364/474, 475; 318/571, 318/573, 579; 82/28, 5

[56] References Cited

U.S. PATENT DOCUMENTS

| | | | |
|---|---|---|---|
| 3,854,353 | 12/1974 | Cutler | 364/475 |
| 3,949,285 | 4/1976 | Rosshirt | 318/571 |
| 4,019,035 | 4/1977 | Tanner | 318/573 |
| 4,096,770 | 6/1978 | Tanner | 318/571 |
| 4,173,786 | 11/1979 | Kuhnell et al. | 364/475 |
| 4,250,551 | 2/1981 | Paveglio, Jr. et al. | 318/474 |

Primary Examiner—Jerry Smith
Assistant Examiner—John R. Lastova
Attorney, Agent, or Firm—Ormand R. Austin

[57] ABSTRACT

A method is disclosed for machining multiple entry threads on a workpiece. The preferred steps of the method are preferably carried out in conjunction with a computer-based numerical control system. The method includes the steps of: determining the angular position of the workpiece as it is being rotated by a machine tool spindle; determining the desired separation of thread entry points; specifying the angular position of the workpiece at the start of tool motion for cutting a first thread on the workpiece, the angular position being stored as a reference angle; and for each subsequent thread, starting motion of the cutting tool from the first thread starting point whenever the angular position of the workpiece is displaced from the reference angle by an amount equal to the desired entry point separation from the first entry point, the motion being maintained along the identical path used to cut the first thread.

3 Claims, 8 Drawing Figures

METHOD FOR PRODUCING MULTIPLE ENTRY THREADS

Reference is made to a microfiche appendix forming a part of this application comprising one microfiche containing 31 frames.

This invention relates to numerically controlled machine processes and, more particularly, to a method for numerically controlled machining of multiple entry threads.

BACKGROUND OF THE INVENTION

Multiple entry threads (i.e., multiple parallel threads on a single shank with each thread having its own entry point at the end of the shank) are used for providing quick engagement between the threaded shank and the opposingly threaded, mating part. The mating part must also have multiple threads and requires a thread pitch equal to that of the multiple threads. Multiple entry threads have a number of applications, including their use to aid the quick replacement of automobile racing wheels.

The conventional method for machining multiple entry threads is to initially produce a single thread and then to machine each additional thread by starting the cutting tool from a backed off position (along the threading axis) whose distance away from the thread entry point is proportional to the thread lead and inversely proportional to the number of threads to be cut. For example, to produce a double entry thread by the prior art method, an initial thread is cut, then the cutting tool is backed off from the initial entry point by one-half of the thread lead (thread lead is the distance between turns of the same thread). The backed off distance is thus added to the length of the threading path followed by the thread cutting tool. This method is effective because the speed at which the cutting tool is moved forward is directly related to the speed of the spindle which is turning the workpiece. As the workpiece rotates, the cutting tool advances to make contact at the desired entry point. This conventional method is more fully discussed herein below in connection with FIG. 1 and in contrast to the method of the present invention.

A significant problem with the prior art method is that clearance is always required at the end of the workpiece to accommodate the backoff placement of the cutting tool. This accommodation cannot always be easily made. In addition, there are the problems of wasted motion and time as the cutting tool traverses the backed off distance on each cutting pass. In effect, the threading pass is made longer for each additional thread although the thread length remains the same.

It is, accordingly, the principal object of the present invention to provide a method for producing multiple entry threads by which the need for tool backoff is eliminated; a method which may be implemented in a numerically controlled system in which the thread cutting tool starts from substantially the same position for each thread.

SUMMARY OF THE INVENTION

These and other objects are attained in a method for machining multiple entry threads on a workpiece, the preferred steps of which are carried out in conjunction with a computer-based numerical control system, and which comprise the following:

(a) providing a signal indicative of the instantaneous angular position of the workpiece as it is being rotated by a machine tool spindle;

(b) determining the desired separation of thread entry points by dividing 360° by the number of entry points or by the number of threads;

(c) cutting a first thread by passing the cutting tool along a predetermined path from a starting point while specifying the angular position of the workpiece at the initiation of tool motion, such position being stored as an index or reference angle; and (d) then, for each subsequent thread, starting motion of the cutting tool from the same starting point at such time as the angular position of the workpiece is displaced from the index or reference angle by an amount equal to the desired entry point angular separation from the first entry point, the motion being maintained along the identical path used to cut the first thread.

This method produces multiple parallel threads on the workpiece and each pass of the cutting tool is started from the same position without the need for backoff clearance and the resulting wasted time and motion in traversing the backoff paths.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

FIG. 1 comprising

DETAILED DESCRIPTION OF THE INVENTION

Figure 1A:
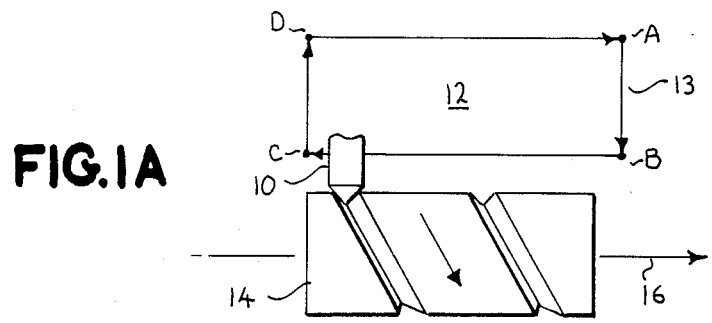
FIGS. 1A–1C, is a schematic illustration of the prior art method for machining multiple entry threads on a workpiece.
Figure 1B:
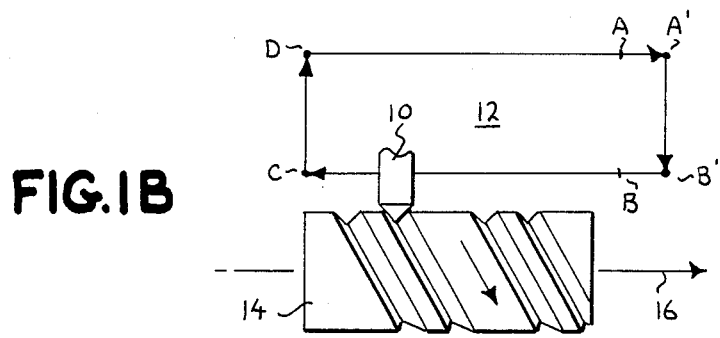
Figure 1C:
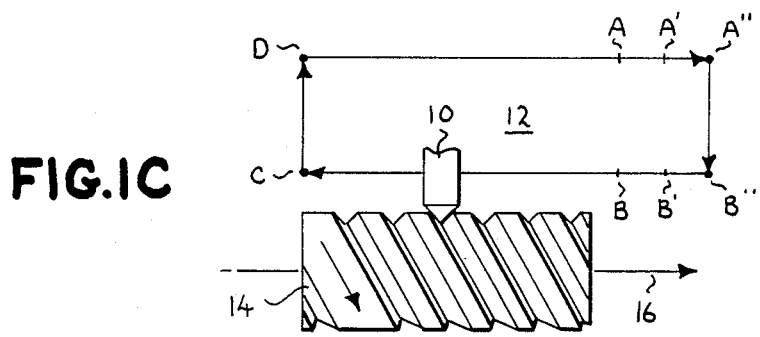

Initially, it will be helpful to describe the prior art method of machining multiple entry threads as carried out by a numerically controlled cutting tool. FIGS. 1A–1C schematically illustrate the process for a triple entry thread, for example. These figures show a cutting tool 10 whose programmed, or otherwise controlled, path 12 is designed to produce the desired triple entry threads on the workpiece 14. The cutting tool path is illustrated by the arrowed lines 13, showing in each case, a generally rectangular pattern. The workpiece 14, during the thread cutting operation, is being rotated at some uniform speed about an axis of rotation 16. Means for providing such rotation are not specifically illustrated.

In FIG. 1A, for example, the cutting tool 10 starts at point A, advances inward toward the workpiece to point B, makes a threading move from point B to point C parallel to the axis of rotation 16, then is withdrawn from C to D, and is returned to the starting point A.

For the second, parallel thread, (illustrated in FIG. 1B) the tool 10 must be backed off parallel to the axis of rotation 16 by a distance equal to one-third the thread lead length. The fraction one-third arises from the fact that three threads are to be cut. The backoff distance is thus shown as the distance A—A'. The cutting path for the second thread thus starts at point A', progressing to B', to C and back to A'.

For the third thread, illustrated in FIG. 1C, the tool is backed off by two-thirds of the lead length to start from A''. The cutting tool 10 then follows the path from A'' to B'', to C, through D and then to a final position. As FIGS. 1A–1C illustrate, in the prior art method, the backoff distance increases with each thread to be cut. It will, of course, be recognized, that for each thread, multiple cutting passes may be made in which tool 10 is advanced to make a slightly deeper cut on each pass in order to obtain the final thread depth and to compensate for tool deflection.

Figure 2:
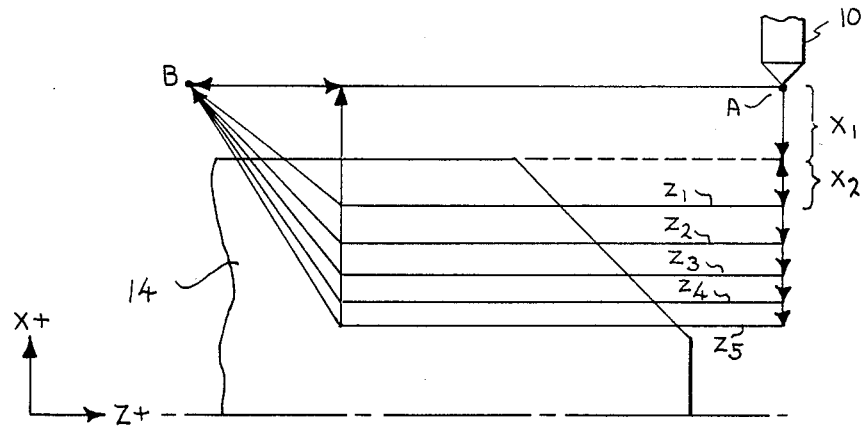
FIG. 2 is a schematic illustration of a path followed by a tool cutting multiple entry threads according to the present invention.

In contrast to the prior art method, in carrying out a method in accordance with the present invention, schematically illustrated in FIG. 2, the cutting tool 10 traverses an identical path for each thread. From a single starting point, the tool 10 makes as many cutting passes per thread as is required for the desired thread depth, including additional no load passes to correct for tool and part deflection. Multiple, parallel threads are made by keying the starting motion of the cutting tool (from the starting point) to an angular position of the workpiece. It will be recognized, however, that a cutting pass may also be made on each thread at one cutting depth before advancing the tool to the next cutting depth for again making cutting passes on all threads. The important point is that the cutting tool always starts from the same point so that there is no need for clearance to back the tool off nor is there any wasted movement of the tool.

In the threading cycle illustrated in FIG. 2, the tool 10 makes a first pass by moving from starting point A toward the workpiece 14 a distance equal to an offset distance $X_1$ plus the infeed distance $X_2$. The workpiece is, of course, being rotated about an axis of rotation parallel with the Z axis so that a thread entry point for the first thread is produced at some angular position of the workpiece. The angular position of the workpiece at the first thread entry point may conveniently be referred to herein as the index angle. The tool is next moved parallel to the axis of rotation, following the path $Z_1$ for the length of the thread. At the end of the thread the tool may be pulled directly out of the thread or, as shown, may be pulled out at a slight taper to point B. After the tool has pulled out from the thread, it then traverses back to the starting point A. The tool is preferably restarted along a path identical to the first pass just described but with the workpiece 14 in a different angular position so that the next thread entry point is separated from the first thread entry point by the desired angular separation. After a first pass on all threads, the tool 14 again starts from point A but plunges to a greater depth for the next pass, again passing along all threads at the same depth. The number of subsequent passes (illustrated as $Z_2$, $Z_3$, $Z_4$, and $Z_5$) at the same depth as equal to the number of parallel threads. In cutting multiple parallel threads, as in conventional threading, traversing moves of tool 10, such as along offset distance $X_1$, are made at an arbitrary speed. Threading moves, however, such as along cutting path $Z_1$, are made with the speed of the cutting tool 10 proportional to the rotational speed of the workpiece 14.

Figure 3:
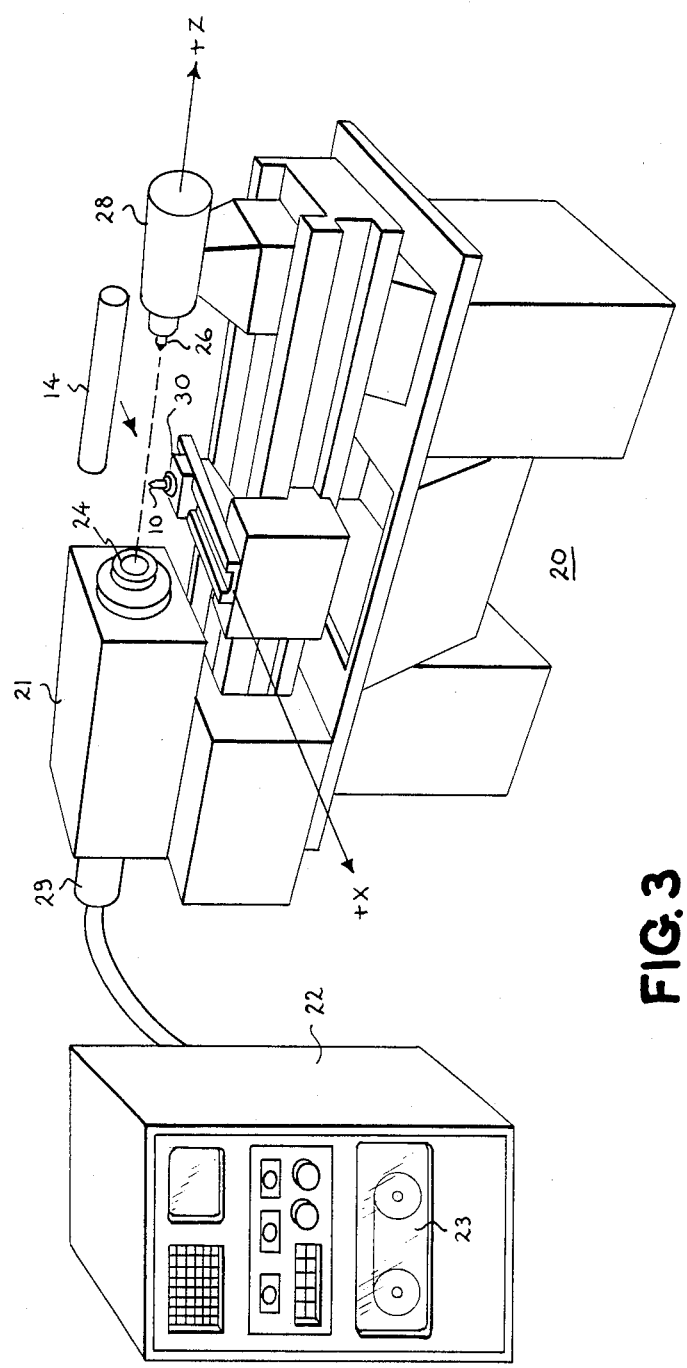
FIG. 3 is a simplified schematic illustration of a numerically controlled lathe for machining multiple entry threads according to the invention.

Referring now to FIG. 3, the method of the present invention is preferably carried out in connection with a turning machine or lathe, 20 whose operation is controlled by microcomputer-based numerical controller 22. FIG. 3 is greatly simplified to facilitate an understanding of the invention, but, as is conventional, lathe 20 includes a chuck 24 which holds the workpiece 14 in one end while the opposite end is held against a centering mechanism 26 mounted on tailstock 28. The spindle drive motor (not specifically illustrated) mounted within spindle drive housing 21 rotates the chuck 24 and hence the workpiece 14 as it is mounted in the lathe. An angular position transducer 29 (e.g., a resolver or shaft encoder) is connected to the spindle drive and is driven thereby to provide a signal indicative of the instantaneous angular position of the spindle. Thus, there is provided a signal indicative of the instantaneous angular position of chuck 24 and the workpiece 14 as it is held in the chuck. A tool holding mechanism 30 carries a cutting tool 10 which is used, in this instance, for cutting threads on workpiece 14. The tool holding mechanism 30 includes conventional carriage means so that the cutting tool 10 can be moved in two dimensional directions, i.e., either in a direction parallel to the axis passing through the chuck 24 and centering mechanism 26, or perpendicular thereto. Thus, in terms of the workpiece 14, the cutting tool 10 may be moved parallel to the longitudinal axis of the workpiece 14 or it may be moved perpendicular thereto. It may at times be convenient herein to refer to the longitudinal axis of the workpiece as the Z axis and the axis perpendicular thereto as the X axis. The cutting tool 10 thus is movable in a plane parallel to the X Z plane.

Controller 22 directs motion of the cutting tool 10 in accordance with a part program which may be supplied from a device such as a paper or magnetic tape reader 23, illustrated as part of the controller 22, but which may be a separate, external device. Alternatively, a part program may be entered through an operator keyboard on the control 22. As is well known, part programs are divided into command blocks or work statements wherein each block of information within a part program defines a unidirectional movement of the machine cutting tool 30 with respect to the workpiece 14. There are certain moves, however, such as circular arcs or thread cutting cycles which are defined by "canned cycles" called by command blocks within the part programs. In terms of the present invention, the part program would be such that cutting tool 10 is directed to cut a multiple entry thread on the workpiece using the method of the invention. The part program in such case provides the parameters for the multiple entry thread, providing, for example, information on the number of threads and the thread lead length. The program for implementing the essential steps of the method is resident in the controller 22.

Computer numerical controller 22 may, for example, be a Mark Century ® 2000 computer numerical control (CNC) available from General Electric Company. However, the method is applicable to other computer numerical control systems available from other manufacturers.

Figure 4:
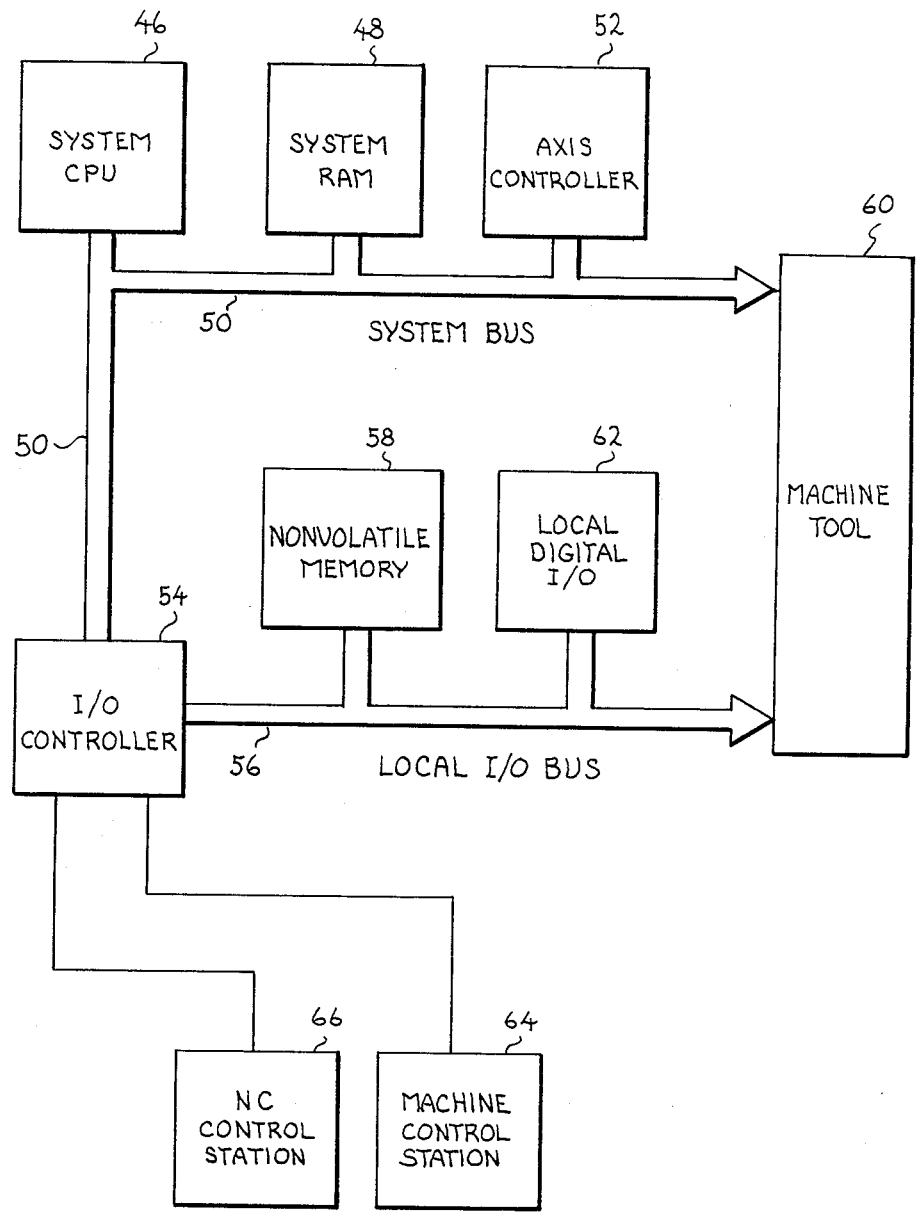
FIG. 4 is a simplified partial block diagram of a computer numerical control system by which the present invention may be implemented.

The Mark Century 2000 CNC is a microprocessor based control unit employing Intel 8086 and 8087 microprocessors. The hardware architecture for the Mark Century 2000 CNC is shown in FIG. 4. A system central processing unit (CPU) 46 performs processing operations for the system and contains the Intel 8086 and 8087 microprocessors. A system dynamic RAM 48 (Random Access Memory) contains read-write memory for the system and is coupled to the system CPU and other functional portions of the system through a system bus 50. An axis controller 52 connected to the bus provides several control functions for each driven axis of the machine tool. The axis controller contains its own microprocessor (not shown) which serves as a front end processor to interface a coordinated group of motion axes of the machine tool 60 to the system bus 50 while other processors within the controller 52 perform computations for the controlled axis. Machine tool 60 is a generalized representation of lathe 20 of FIG. 2. An input-output (I/O) controller 54 coordinates the system bus I/O operations and thus serves to connect the system bus 50 to a local I/O bus 56. The local I/O bus 56 connects the system to a non-volatile memory 58 in which the part programs and all system data which must be preserved are stored. The local I/O bus 56 also is connected to a local digital I/O 62 which is functionally associated with a machine control station 64. The local digital I/O 62 generates digitized actuator control signals for the machine tool 60 and provides feedback status data from the machine tool 60.

An NC control station 66 is also connected to the I/O controller 54. The NC control station 66 serves as a front panel to machine tool operators and part programmers. The machine control station 64 is a control panel from which the machine tool operator can perform manual operations and control the execution of the part programs. These control panels are generally illustrated as features of the NC control 22 of FIG. 3.

The CNC illustrated in FIG. 4 operates under control of the system CPU 46 executing programs resident in the system RAM 48. Part programs may be input from an external device such as a paper tape cassette reader through the I/O controller 54 or the keyboard of the NC control station 66. Any part program which is input to the system is stored by the I/O controller 54 into non-volatile memory 58. The system CPU directs the execution of other part programs through the I/O controller 54 and the axis controller 52. Part programming axis commands are executed through the axis controller 52 which is connected to the machine tool 60, such as the lathe 20, illustrated in FIG. 3. The machine tool 60 contains axis feed drives which are under control of the axis controller 52. Non-axis commands are executed through the I/O controller 54, connected to the machine tool 60 through the local digital I/O bus 56. Commands entered with pushbuttons and controls on machine control station 64 are communicated to the I/O controller 54 and finally to the machine tool 60 through either the axis controller 52 or the local digital I/O bus 56.

As is well known, a CNC, as with most other computer control systems, is evolved from a hardwired system into essentially a computer architecture which is customized into a firmware control system through the use of software. Computer programs, i.e., software, provide the method for reconfiguring each of these computer systems into a system equivalent to those earlier hardwired systems. The method disclosed is thus configured in the form of a computer program which forces the hardware system illustrated in FIG. 4 to operate in a particular fashion in order to implement the improved method.

Figure 5:
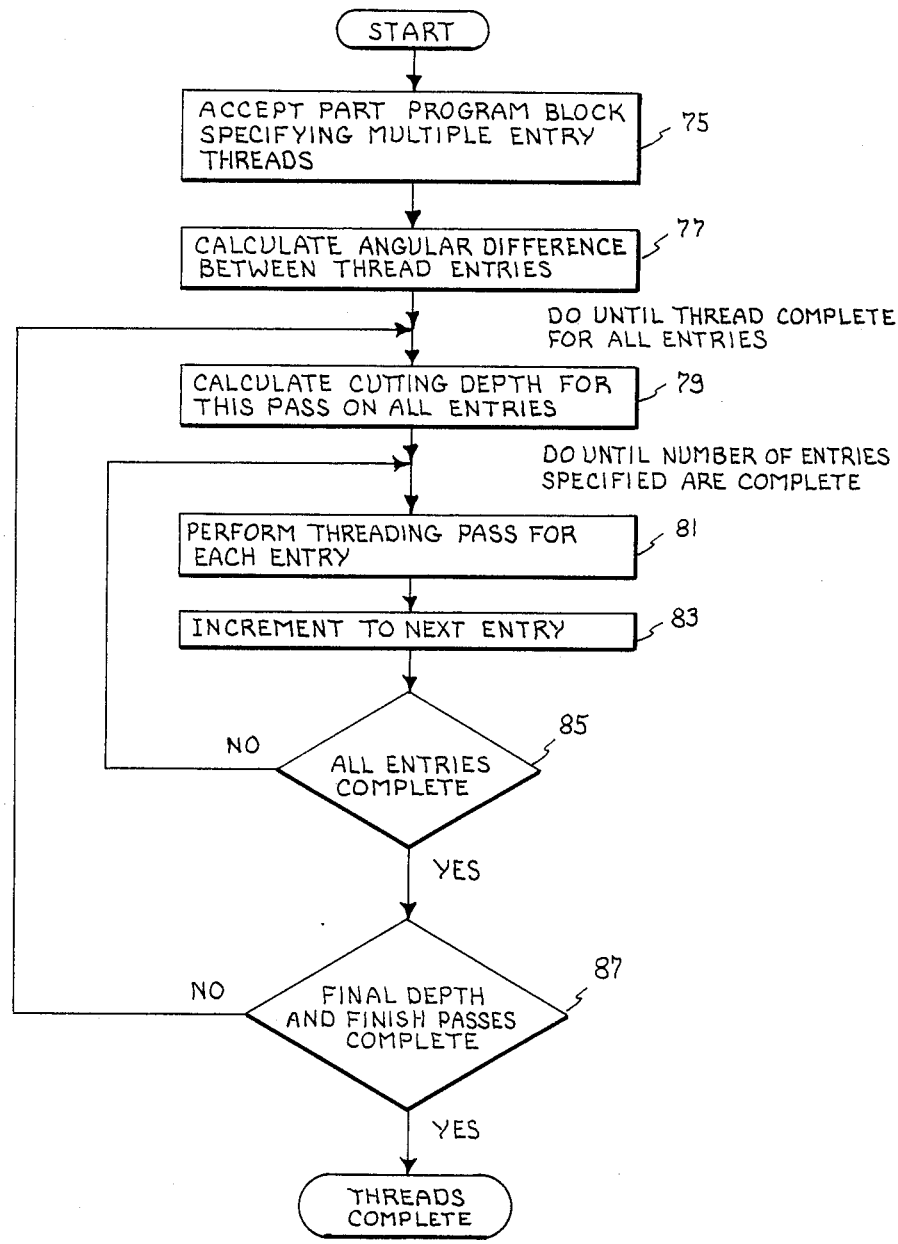
FIG. 5 is a high level flow chart illustrating preferred steps for carrying out the present invention.

Referring now to FIG. 5, there is shown a high level flow chart which graphically illustrates a method according to the invention for machining multiple entry threads with a computer numerically controlled machine tool. The flow chart of FIG. 5 provides the basis for a software program which is operable on a CNC such as that of FIGS. 3 and 4. The program of the microfiche appendix hereto is a preferred form of such a program and was written for operation on a Mark Century 2000 control as has been described above.

In FIG. 5 at box 75, there is an initial acceptance of a program block from a part program which, as mentioned above, may be stored on some storage media such as magnetic or paper tape. The part program specifies that multiple entry threads are to be cut and provides information such as the number of threads and the thread lead length. For a Mark Century 2000 CNC, for example, the following table includes the control words and parameters programmed for multiple pass, constant lead thread cutting sequences. The program is for a triangular cutting tool used in a plunge infeed cutting method wherein the incremental infeed of the tool on each cutting pass is controlled to remove an equal volume of metal.

| CONTROL WORD | DESCRIPTION |
| --- | --- |
| G84 | Plunge Threadcutting, Longitudinal |
| X* | Absolute Coordinate of Thread Bottom |
| U | Total Thread Depth |
| Z* | Absolute Coordinate to End of Thread |
| W | Thread Length |
| $P_1$ | Incremental Infeed Distance |
| $P_2$ | Thread Lead |
| $P_3$ | Taper Data |
| $P_4$ | Pull Out Data |
| $P_5$ | Number of Load Passes at Final Depth |
| $P_6$ | Number of Threads to be Cut |

*X or U; or Z or W alternately.

Next, at box 77, the computer numerical control, using resident application software, calculates the angular difference between thread entry points. This difference, termed $\alpha$, is determined simply by dividing 360° by M, the multiplicity of the number of threads to be cut. For example, for three threads the angular separation $\alpha$ is 120°.

For each pass of the cutting tool a cutting depth, or tool infeed distance, is determined as indicated at box 79. As mentioned above, the infeed distance on each cutting pass is such that an equal volume of metal is removed from the workpiece. To achieve this result, the infeed distance for the first pass is specified by the part program and, then, on subsequent passes the initial infeed distance is simply multiplied by the square root of the pass number. For example, infeed distance of the tool on the second pass is $\sqrt{2}$ times the initial infeed distance.

After an infeed distance is determined, a threading pass is directed at box 81. The threading pass at each infeed depth is repeated for each of the multiple threads until the particular cutting pass has been carried out for all threads. That is, a pass is made on all threads at the same cutting depth before an infeed movement of the cutting tool is made. This is implemented by the functional steps of boxes 83 and 85. The details of the threading pass, box 81, are more fully discussed herein below in connection with FIG. 6.

After all passes at one depth (unless the tool is at the final depth and all finished passes are complete), there is a return to step 79 for calculation of a new infeed distance which is then followed by implementation of cutting passes at the newly calculated depth. This process is reiterated until all threads are cut to the final depth as determined at box 87.

Figure 6:
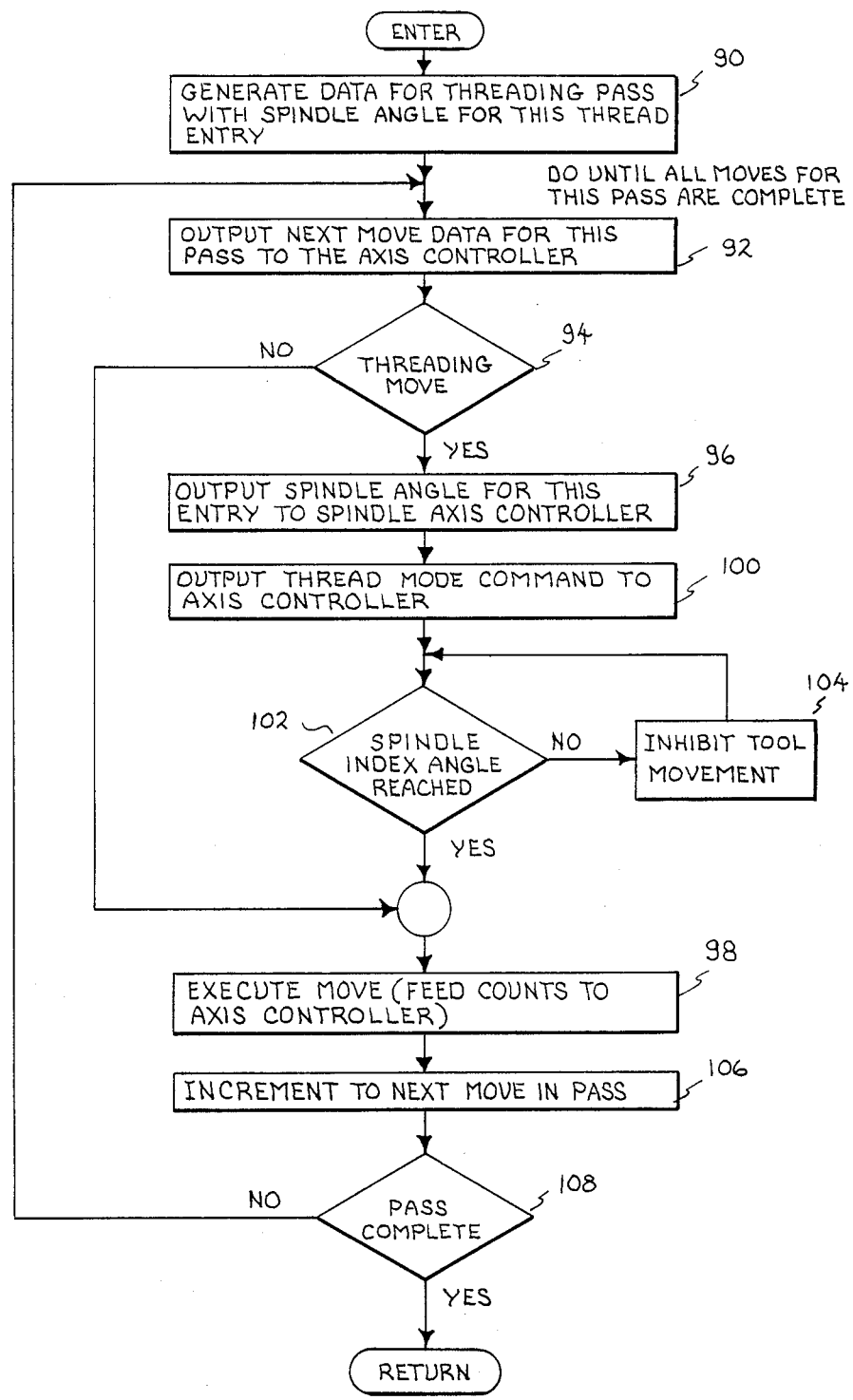
FIG. 6 is a detailed flow chart illustrating the threading pass step of FIG. 5.

The threading pass is set forth in detail in the flow chart of FIG. 6. Initially at step 90, data regarding all moves of the cutting tool for a given thread are generated. That is, the angle of the workpiece driving spindle for the thread entry point is generated along with distance and rate data for each movement of the cutting tool. It will be recalled from the discussion above in connection with FIG. 2 that, in a thread cutting operation, there are threading moves and traversing moves. For the cutting moves, the movement of the cutting tool is necessarily related to, or synchronized with, the speed of the spindle which is turning the workpiece. During a traversing move, on the other hand, the object is merely to traverse some distance and the speed at which the tool is moved may be entirely independent of the spindle speed.

Once the data for the threading pass are generated, the moves (threading or traversing) for that pass are provided in sequence (box 92) to the axis controller (as in FIG. 3, for example) to effect movement of the tool accordingly. However, each move is first tested in decision step 94 to determine if it is a threading move or a traversing move. If the move is a threading move for the particular pass being made, then step 96 is entered and the angle of the spindle for the entry point of the particular threading pass is provided to the spindle axis controller. The spindle axis controller controls and monitors the spindle drive, and may, for example, be part of the axis controller 52 of FIG. 4. On the other hand, if the move is not a threading move, step 98 is entered and the traversing move is executed immediately.

For a threading move, a command is provided, box 100, to the axis controller to signal that the feed rate (i.e., the rate of tool movement relative to the workpiece) is to be proportional to the spindle speed and that any other feed rate commands are not to be followed. The angular position of the spindle is being continuously monitored, as by transducer 29 of FIG. 2, so that once the spindle is in the correct angular position as determined at decision box 102, the threading move data is passed and the move is executed as at step 98. Until the desired spindle angle is reached, however, the axis controller is inhibited at box 104 from effecting a movement of the tool and the angular position of the spindle continues to be monitored.

Once a commanded move of the tool is executed, the process is incremented at step 106 to produce the next move in the pass. Each move is tested at step 108 to determine if the pass is complete. If not, there is a return to step 92 to start the next move. The process is repeated until all moves of a pass are complete. There is then an increment to begin the next thread entry as shown at box 83 of FIG. 5.

Although a method according to the invention is preferably carried out in conjunction with a computer numerical control system programmed to implement the method in accordance with the flow charts of FIGS. 5 and 6, it will be apparent to those of skill in the art that the method may be implemented in other sequences and by various other control means. Advantageously, the invention is embodied in a method according to the flow charts discussed above and includes the following steps:

(a) providing an indication of the angular position of a workpiece to be multiply threaded as it is being turned on an axis of rotation;

(b) determining a desired equal angular separation between the multiple thread entry points on the workpiece;

(c) initiating motion of a threadcutting tool along a threadcutting path whenever the angular position of the workpiece is at a specified index angle; and (d) for each additional thread, initiating motion along the threadcutting path whenever the angular displacement of the workpiece from the index angle is equal to the angular separation between such thread and the first thread.

Thus, while there has been shown and described what is considered to be a preferred embodiment of the invention, it is understood that various other modifications may be made therein. It is intended to claim all such modifications which fall within the true spirit and scope of the present invention.

The invention claimed is:

1. For use with a numerically controlled machining tool, a method for machining multiple entry threads on a workpiece being rotated upon an axis of rotation, comprising the steps of:

(a) providing, from a sensing means, a continuous indication of the instantaneous angular position of said workpiece about said axis of rotation;

(b) determining the equal angular separation between entry points for said multiple entry threads from the relationship $\alpha = 360/M$, where M is equal to the multiplicity of entry points and $\alpha$ is the angular separation between said points;

(c) initiating motion of said cutting tool from a starting point and maintaining said motion along a controlled path predetermined for cutting a first thread on said workpiece such that an entry point for said first thread is produced at an arbitrary angular position of said workpiece, the angular position of said workpiece occurring at the initiation of said motion being defined as an index angle; for each additional thread entry point:

(d) determining the angular separation thereof from the entry point for said first thread, said determination being based on the equal angular separation of step (b);

(e) initiating motion of said cutting tool from said starting point whenever the angular position of said workpiece with respect to said index angle is equal to the angular separation of said additional entry point from the entry point for said first thread; and (f) maintaining motion of said cutting tool along said controlled path predetermined for cutting said first thread so that an additional thread, parallel to said first thread, is cut having an entry point at the angular separation determined from step (d).

2. The method of claim 1 wherein steps (c) through (f) are repeated with the cutting tool at a greater cutting depth for each repetition until a final thread depth is reached.

3. The method of claim 2 wherein each said greater cutting depth is selected such that an equal volume of material is removed from said workpiece on each repetition.

* * * * *